P. R. BISSELL.
METAL SCRAPING MACHINE.
APPLICATION FILED DEC. 30, 1908.
953,117.
Patented Mar. 29, 1910.
3 SHEETS—SHEET 1.
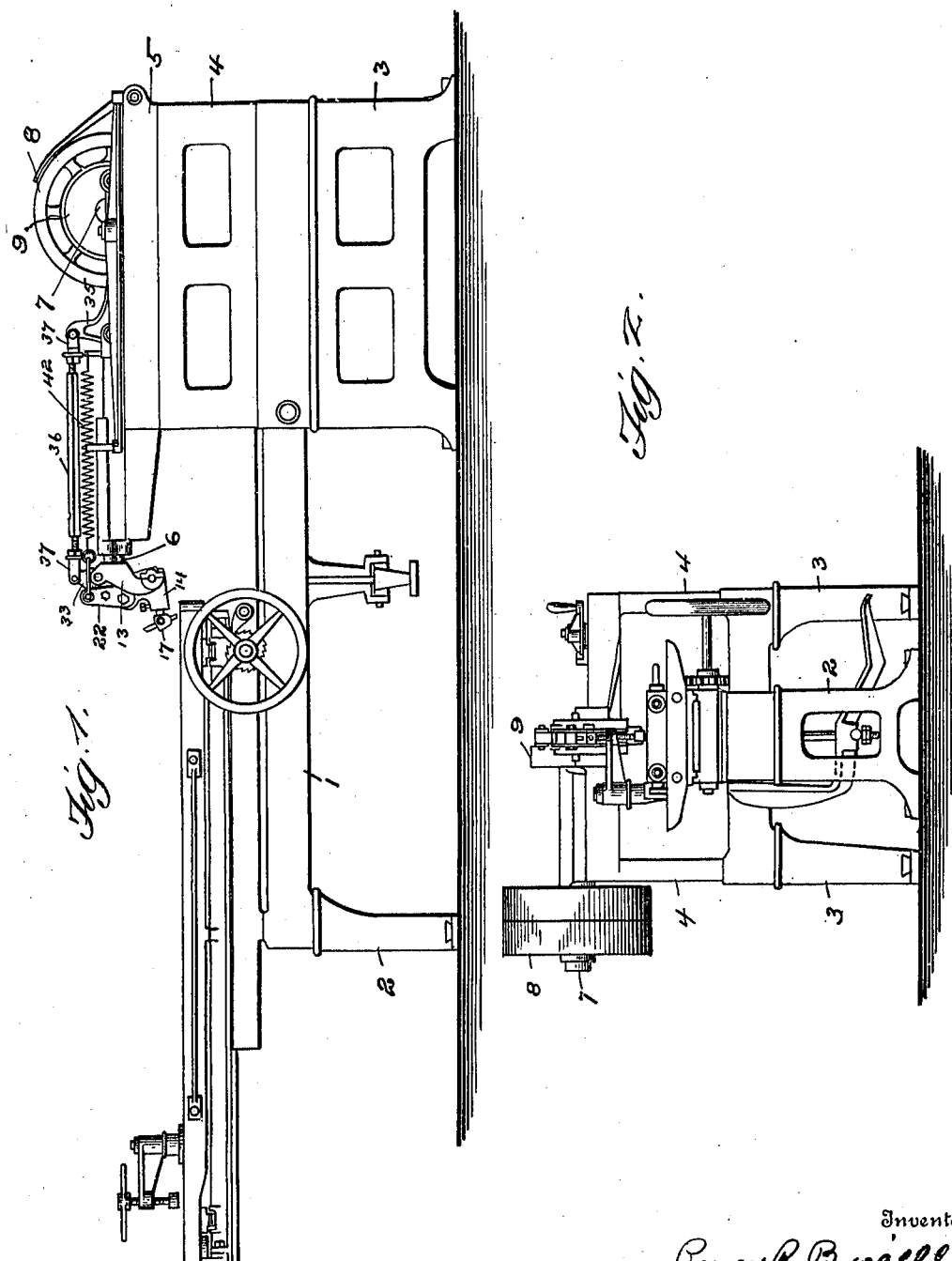

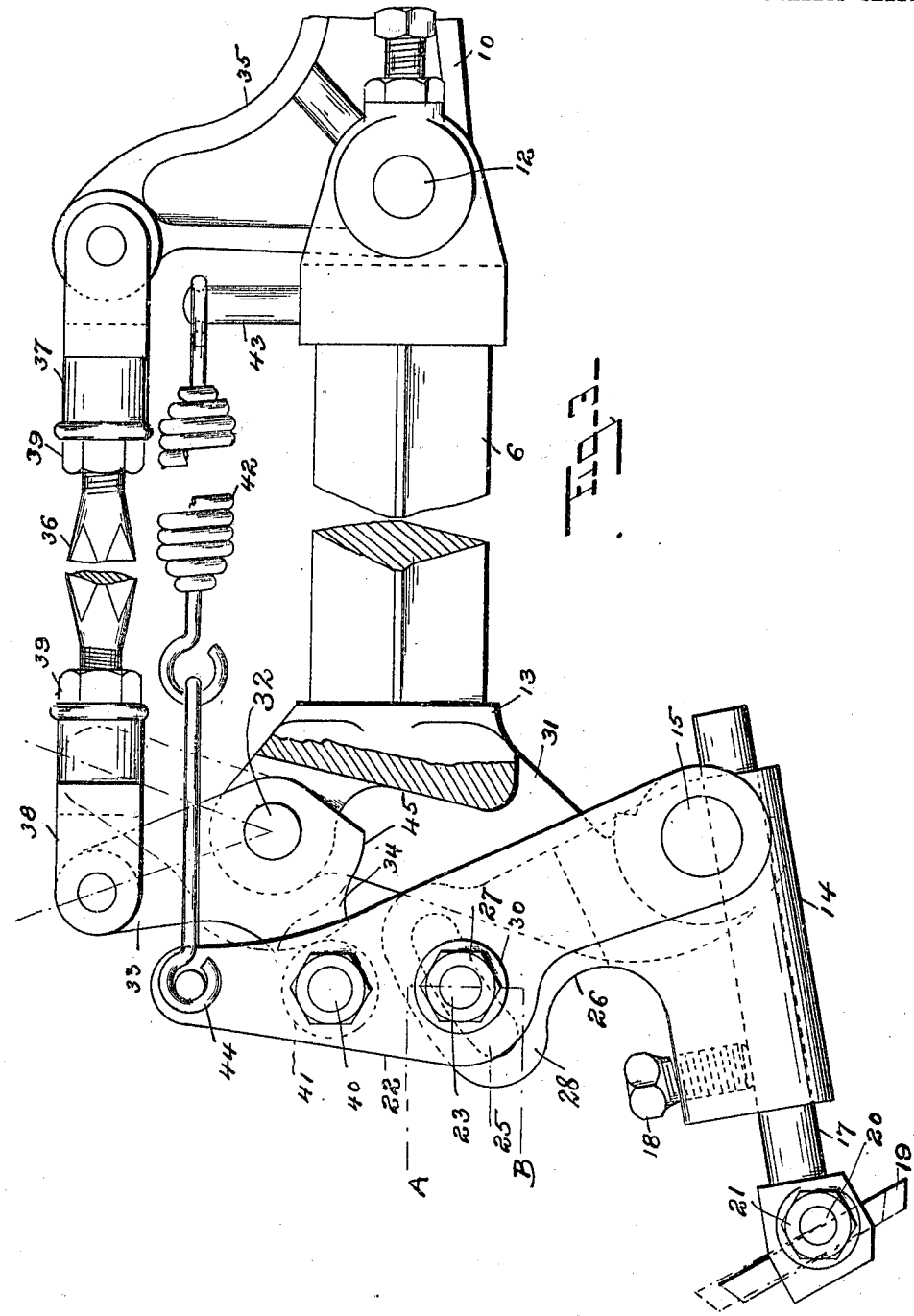

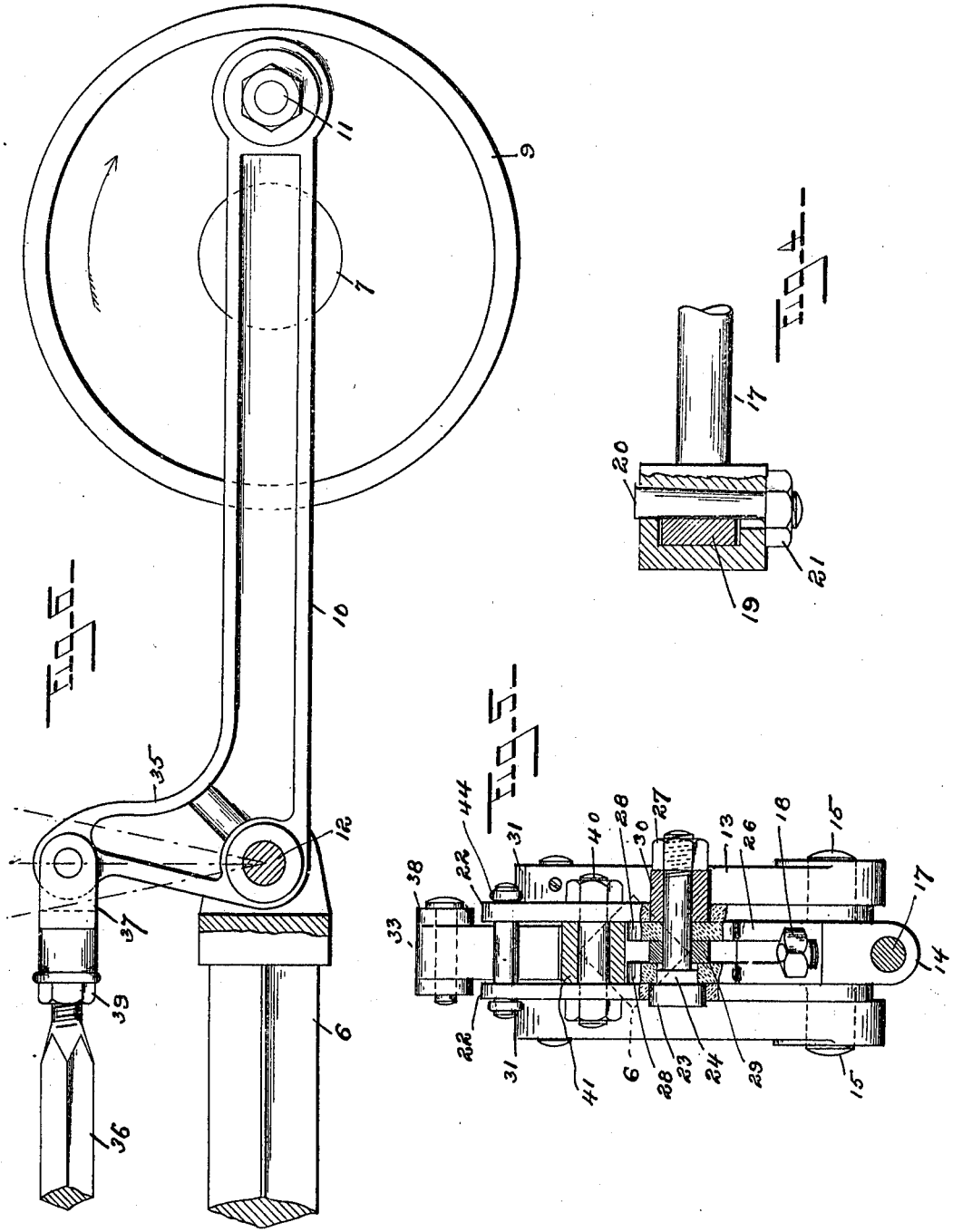

UNITED STATES PATENT OFFICE.

PERCY R. BISSELL, OF WATERBURY, CONNECTICUT, ASSIGNOR TO THE WATERBURY FARREL FOUNDRY AND MACHINE COMPANY, OF WATERBURY, CONNECTICUT, A CORPORATION OF CONNECTICUT.

METAL-SCRAPING MACHINE.

953,117.      Specification of Letters Patent.      Patented Mar. 29, 1910.

Original application filed March 14, 1908, Serial No. 421,020. Divided and this application filed December 30, 1908. Serial No. 470,123.

*To all whom it may concern:*

Be it known that I, PERCY R. BISSELL, a citizen of the United States, residing at Waterbury, in the county of New Haven and State of Connecticut, have invented certain new and useful Improvements in Metal-Scraping Machines, of which the following is a specification, reference being had therein to the accompanying drawings.

My invention relates to new and useful improvements in metal scraping machines, and has for its object, among other things, to produce a machine of this character which can be operated at a high speed; provided with means for imparting movement to the cutter; means for adjusting said movement in relation to the lengthwise movement thereof, both as to time when said movement shall begin and the time consumed thereby; as well as to make the machine of the fewest possible parts, so designed as to have the maximum strength at the minimum cost.

To these, and other ends, my invention consists in the metal scraping machine, having certain details of construction and combinations of parts as will be hereinafter described and more particularly pointed out in the claims.

Referring to the drawings, in which like numerals of reference designate like parts in the several figures: Figure 1 is a side elevation of my improved scraping machine complete; Fig. 2 is an end elevation thereof; Fig. 3 is a side elevation in detail of the slide, tool holder and the parts operating the same; Fig. 4 is a fragmentary plan of the cutter holder; Fig. 5 is an end elevation of the parts shown in Fig. 3, partly in section, looking from the left of Fig. 3; and Fig. 6 is a side elevation of the crank disk and connection.

The scraping machine herein shown and described is used for removing the outside surface from sheets of brass, german silver, or similar metals, after the first or breaking down operation of rolling. The sheet is clamped upon a movable table having a transverse and longitudinal motion under easy control of the operator and is brought up against the cutter by depressing a foot treadle. The cutter has a fixed stroke, substantially parallel with the table and is secured in a holder that is mounted so as to keep the cutter in contact with the sheet during the cutting stroke and away from the sheet during the return movement.

In the practice of my invention I provide a bed 1 supported at its ends by the legs 2 and 3 and over one end thereof the top frame 5 is supported by the side frames 4, within which is mounted the slide 6 and the shaft 7 having a crank disk 9 fixed thereon at one end and the pulleys 8 at the other end.

Movement is imparted to the slide from the crank disk 9 through the connection 10 secured to said crank disk by the crank pin 11 and to the slide by the pin 12. The forward end of the slide 6 terminates in a vertically slotted head 13 between the walls of which is operative the tool holder 14 having laterally projecting trunnions 15 that are journaled in the lower end of the head 13. Adjustably secured within the tool holder 14 by the screw 18 is the cutter holder 17 carrying a cutter 19 that is held fast by a tapered bolt 20 having a nut 21 thereon. Between the walls of the head 13 and the tool holder 14 upon both sides thereof are the side plates 22 which are mounted upon the trunnions 15—15 so as to be movable thereon. The tool holder 14 has an integral arm 26 that is slotted (Fig. 5) to provide the wing sections 28 through which are the circular slots 25. An adjustable connection is made between the side plates 22 and tool holder 14 by the bolt 23 which passes therethrough and through the wings 28 having a nut 27 upon its outer end, the squared portion 24 of said bolt being slidable in and held against rotation by the circular slot in one of said wings. Between the wings 28 is a collar 29 and next to the nut 27 is a collar 30. This method of securing the tool holder to the side plates permits of an adjustment of the cutter in relation thereto by unloosening the nut 27 and shifting the tool holder to the desired position, after which it is permanently secured by tightening the nut 27. Upon examination of Fig. 5 it will be seen that when said nut is tightened there are four contact surfaces, that is, both inside and outside of each of the wings 28, to rigidly secure said tool holder, thus increasing by two-fold the ordinary means for frictionally securing a device of this character.

Pivotally mounted upon the pin 32 between the ears 31 of the head 13 is the lever 33 having a cam projection 34 thereon, and joined to the arm 35 of the connection 10 by a rod 36 which is threaded at one end in the clevis 37 pivotally connected to the arm 35 and at the other end to a clevis 38 pivotally connected with the lever 33. Adjustment of the pivotal connections toward and away from each other is obtained by rotating the rod 36 which is provided with a right hand thread at one end and a left hand thread at the other, and when the desired adjustment is obtained locking the parts together by the nuts 39. Rotatably mounted between the side plates 22 upon the stud 40 is the cam roll 41 which is held in contact with the lever 33 by the spring 42 connected at one end to a fixed post 43 and at the other end by a link 44 with the side plates 22. During the movement of the slide 6 through the rotation of the crank disk 9 the oscillating motion of the arm 35 is imparted to the lever 33 through the rod 36, the cam projection 34 contacting with the roll 41. The adjustment of the lever 33 is such that at the end of the cutting stroke the cam projection 34 is moved out of the path of the roll 41 and the spring 42 moves the side plates, tool holder and all of the parts connected therewith until the roll 41 engages the surface 45 on the lever 33, and the cutter 19 is moved upwardly to the position shown by broken lines in Fig. 3. During the return movement of the slide 6 the cam lever 33 is actuated so that the roll 41 again rides onto the cam projection 34 and returns the cutter to its down and cutting position. By adjustment of the relative positions of the lever 33 and arm 35 through the rod 36 the interval of time during which the roll 41 is in contact with the cam projections 34 may be varied, as also the time when said cutter will be moved toward and away from the table in relation to its horizontal movement.

Having described my invention, what I claim as new and desire to secure by Letters Patent, is:—

1. In a metal scraping machine, the combination with a reciprocating cutter; of means for imparting a movement thereto at an angle to its reciprocating path; and means for adjusting the relative time of said angular and reciprocating movements.

2. In a metal scraping machine, the combination with a reciprocating cutter; of means for imparting a movement thereto at an angle to its reciprocating path; and means for varying the relative time consumed in completing said angular movement.

3. In a metal scraping machine, the combination with a slide; of a cutter connected therewith; means connected with a rotary part for reciprocating said slide; means, operative from said connection means, for imparting a movement to said cutter at an angle to its reciprocating path.

4. In a metal scraping machine, the combination with a slide; of a rotary part; a connection between said slide and rotary part; a cutter movably mounted in said slide; and adjustable means between said connection and cutter for moving said cutter in a path at an angle to the path of movement of said slide.

5. In a metal scraping machine, the combination with a slide; of means for imparting a reciprocating movement thereto; a cutter movably secured to said slide; cam means connected with said slide for moving said cutter in relation thereto; and means for actuating said cam during the movement of said slide.

6. In a metal scraping machine, the combination with a slide; of a tool holder movably mounted therein; an oscillating member mounted in said slide, a member connected with said tool holder and engaged by said oscillating member; means for actuating said slide and oscillating part synchronously; and means for adjusting the relative positions of said tool holder and contact member.

7. In a metal scraping machine, the combination with a slide; of a tool holder movably mounted therein; side plates movably connected with said tool holder; means for adjustably securing said tool holder and side plates; a lever movably connected with said slide and engaging a part connected with said side plates; and means for synchronously reciprocating said slide and lever.

8. In a metal scraping machine, the combination with a tool holder having a slotted arm connected therewith; of side plates; and means for movably connecting said tool holder with said side plates, said means comprising a bolt passing through said side plates and slotted arm with the underside of the head thereof in contact with one side of said arm, a collar on said bolt between the wings of said slotted arm, and a collar on the outside of said arm.

9. In a metal scraping machine, the combination with a slide; of a rotary part; a tool holder connected with said slide; a connection between said slide and rotary part; and means for moving said tool holder in a path at an angle to the path of movement of said slide, said means being operated from said connection.

10. In a metal scraping machine, the combination with a rotary part; of a slide; a connection between said slide and rotary part; a tool holder mounted in said slide; and means for oscillating said tool holder within said slide, said means being adjustably secured to said connection.

11. In a metal scraping machine, the combination with a rotary part; of a reciprocating slide; a connection between said rotary part and slide having an arm thereon; a tool holder movably mounted in said slide; and means for oscillating said tool holder, said means being connected with and operative from said connection arm.

12. In a metal scraping machine, the combination with a rotary part; of a slide; a connection between said rotary part and slide with an arm projecting therefrom; a tool holder movably mounted in said slide; a lever movable in said slide for actuating said tool holder; and a connection between said lever and the aforesaid connection.

13. In a metal scraping machine, the combination with a rotary part; of a slide; a connection between said rotary part and slide with an arm projecting therefrom; a tool holder movably mounted in said slide; a lever connected with said slide for moving said tool holder; a connection between said lever and the aforesaid connection; and means for adjusting the relative positions of said lever and connection arm.

14. In a metal scraping machine, the combination with a rotary part; of a slide; a connection between said rotary part and slide with an arm projecting therefrom; a tool holder movably mounted in said slide; a lever connected with said slide for moving said tool holder; and a part connecting said lever and arm, adjustably secured at either end.

15. In a metal scraping machine, the combination with a reciprocating slide 6; of the rotary disk 9; connection 10 having the arm 35 thereon; tool holder 14 movably mounted on said slide; side plates 22 movably mounted on said tool holder; lever 33 movably connected with said slide; and the rod 36, clevis 37 and clevis 38 connecting said arm 35 with said lever 33.

16. In a metal scraping machine, the combination with a reciprocating slide; of a rotary disk; a connection having an arm 35 thereon connecting said rotary disk and slide; a tool holder movably mounted in said slide; side plates movably mounted on said tool holder; and means for adjustably securing said tool holder to said side plates.

17. In a metal scraping machine, the combination with a reciprocating slide; of a rotary disk; a connection having an arm thereon connecting said rotary disk and slide; a tool holder movably mounted in said slide; side plates movably mounted on said tool holder; a roll between said plates; and a lever movably connected with said slide having a cam projection thereon engaging said roll.

18. In a metal scraping machine, the combination with a reciprocating slide; of a rotary disk; a connection having an arm thereon connecting said rotary disk and slide; a tool holder movably mounted in said slide; side plates movably mounted on said tool holder; a roll between said plates; and spring means connected with said side plates and a fixed part on said slide for holding said roll in contact with said cam projection.

19. In a metal scraping machine, the combination with a slide; of means for imparting a reciprocating movement thereto; a tool holder movably mounted in said slide; a cutter holder adjustably secured within said tool holder; cam means connected with said slide for moving said tool holder in relation thereto; and means for actuating said cam during the movement of said slide.

In testimony whereof I affix my signature in presence of two witnesses.

PERCY R. BISSELL.

Witnesses:
M. J. NOONAN,
LEWIS E. FULTON.